(12) United States Patent
El-Gawady et al.

(10) Patent No.: US 8,903,387 B2
(45) Date of Patent: Dec. 2, 2014

(54) DYNAMIC TERMINAL IDENTIFIER ASSIGNMENT

(71) Applicant: Cellco Partnership, Basking Ridge, NJ (US)

(72) Inventors: Sameh El-Gawady, Waltham, MA (US); Alexander Tiraspolsky, Newton, MA (US)

(73) Assignee: Cellco Partnership, Basking Ridge, NJ (US)

( * ) Notice: Subject to any disclaimer, the term of this patent is extended or adjusted under 35 U.S.C. 154(b) by 154 days.

(21) Appl. No.: 13/677,638

(22) Filed: Nov. 15, 2012

(65) Prior Publication Data

US 2014/0135002 A1 May 15, 2014

(51) Int. Cl.
  *H04W 4/00* (2009.01)
  *H04W 8/26* (2009.01)
(52) U.S. Cl.
  CPC ........................... *H04W 8/26* (2013.01)
  USPC ........................... 455/435.1; 455/461
(58) Field of Classification Search
  USPC ............................. 455/435.1, 461
  See application file for complete search history.

(56) References Cited

U.S. PATENT DOCUMENTS

| | | | |
|---|---|---|---|
| 5,740,533 A * | 4/1998 | Lin | 340/7.42 |
| 2006/0178132 A1* | 8/2006 | Tammi et al. | 455/411 |
| 2011/0032906 A1* | 2/2011 | Mutikainen et al. | 370/331 |
| 2013/0343256 A1* | 12/2013 | Zakrzewski | 370/312 |

* cited by examiner

Primary Examiner — Daniel Lai

(57) ABSTRACT

A user device may receive an identifier without prior provisioning from a server. The server may be configured to: receive, from a user device a first identifier, a first value of a second identifier, and an instruction to register the first value with the first identifier; register the first value with the first identifier based on determining that the second identifier is available for registration; receive request for subscription to receive a notification when a second user device registers with the first identifier; provide, to the user device, a list of unavailable or available second values of the second identifiers; receive, from the user device, a second instruction to register one of the available second values with the first identifier and with the user device; and receive, from the user device, a third instruction including an instruction to unregister the first value with the first identifier.

20 Claims, 7 Drawing Sheets

400

| PUID 410 | Registered TIDs 420 | Unregistered TIDs 430 |
|---|---|---|
| 5555845 | 1 | 0, 2, 3, 4 |
| 5558423 | 2,3 | 0, 1 |
| 5553654 | 1,2,4 | 0,3 |

400

| PUID 410 | Registered TIDs 420 | Unregistered TIDs 430 |
|---|---|---|
| 5555845 | 1 | 0, 2, 3, 4 |
| 5558423 | 2,3 | 0, 1 |
| 5553654 | 1,2,4 | 0,3 |

Fig. 4

DYNAMIC TERMINAL IDENTIFIER ASSIGNMENT

BACKGROUND

User devices are sometimes used to send and/or receive telephone calls and/or messages associated with a public identifier (e.g., a telephone number). A user may be associated with multiple user devices and a single public identifier, making it cumbersome for the network to determine which user device is being used to send and/or receive the telephone calls and/or the messages.

BRIEF DESCRIPTION OF THE DRAWINGS

FIG. 4 illustrates an example data structure that may be stored by one or more devices in the environment of FIG. 2.

DETAILED DESCRIPTION OF THE PREFERRED EMBODIMENTS

The following detailed description refers to the accompanying drawings. The same reference numbers in different drawings may identify the same or similar elements.

Systems and/or methods described herein may provide and/or manage unique terminal identifiers (e.g., session identifiers) for multiple user devices having a common public identifier (e.g., a telephone number, a username, and/or some other type of identifier) such that the multiple user devices may be simultaneously used to perform a task (e.g., send and/or receive a voice call, send and/or receive a video call, send and/or receive a text message, or perform some other telecommunications related task) associated with the common public identifier (PUID).

In some implementations, a terminal identifier (TID) may be used to create a network session between a user device and a server, such as a call session control function (CSCF) server, in order to allow a user to perform a task via the user device using a TID-based application (e.g., a voice calling application, a video calling application, a messaging application, and/or some other application). For example, the TID may be used to create the network session in accordance with the $3^{rd}$ generation partnership project (3GPP) standard or in accordance with some other standard.

As described above, the systems and/or methods may provide unique TIDs (e.g., to create a network session between a user device and CSCF server) for user devices having a common PUID. For example, a user may use a single PUID (e.g., a telephone number) to place telephone calls, receive telephone calls, send and/or receive text messages using multiple user devices as a result of unique TIDs being provided to each of the multiple user devices.

In some implementations, user devices may select (e.g., register) a TID based on receiving information regarding available TIDs from the CSCF server. The information regarding available TIDs may be provided based on authenticating and/or authorizing a user device to receive the information regarding available TIDs. As a result, multiple user devices may each determine a unique TID to allow each of the multiple user devices to perform a task associated with a PUID of a user based on each of the multiple user devices selecting an available TID. Further, each of the multiple user devices may release (e.g., unregister) their respective TIDs to make the TIDs available for selection by another user device.

Additionally, the systems and/or methods may not provide TIDs for more than a threshold quantity of user devices at a given time, thereby allowing for network resource management and security management. For example, assume that a threshold quantity of three TIDs applies and three different TIDs have been registered to three respective user devices associated with a user. The systems and/or methods may enforce the threshold and may not allow a fourth TID to be registered to a fourth respective user device associated with the user.

Figure 1:
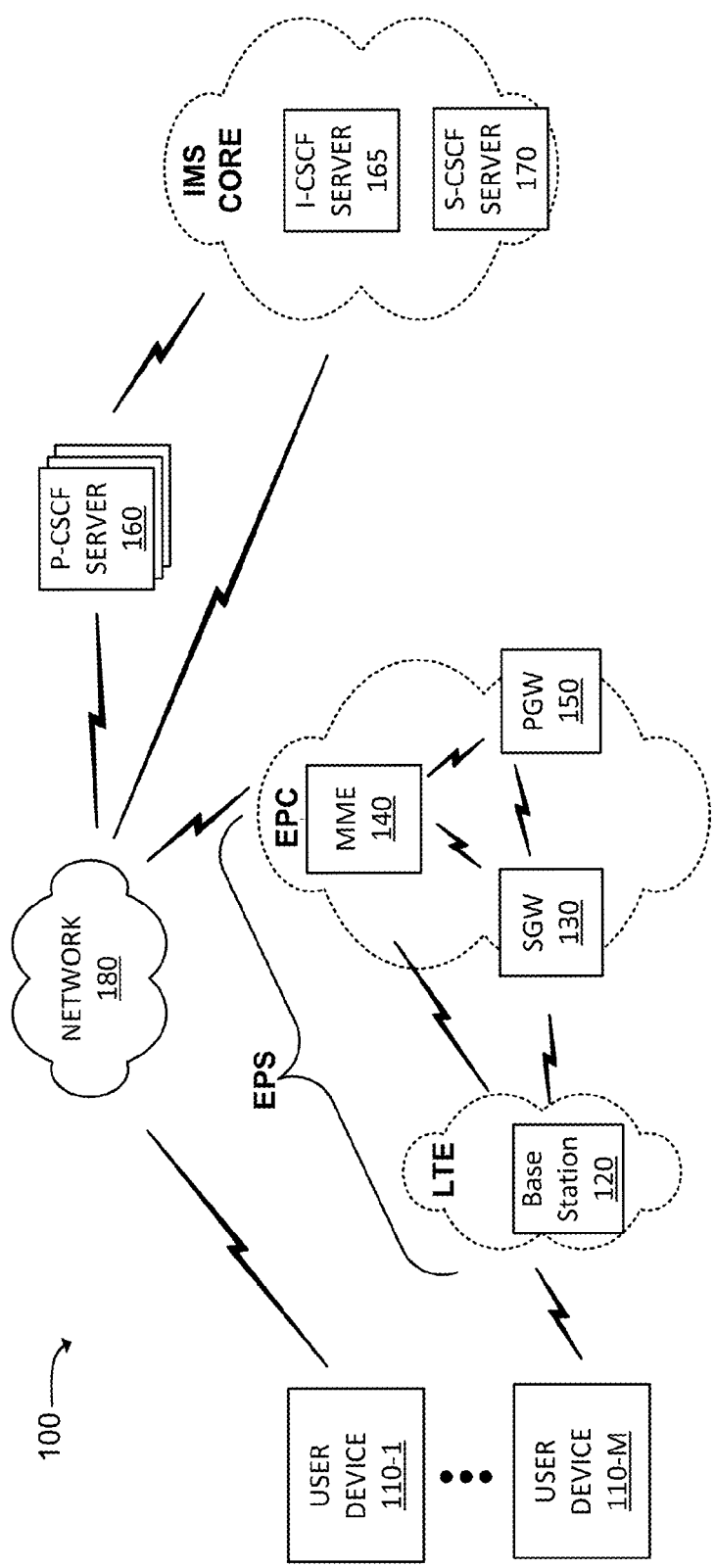
FIG. 1 illustrates an example environment in which systems and/or methods, described herein, may be implemented.

FIG. 1 is a diagram of an example environment 100 in which systems and/or methods described herein may be implemented. As shown in FIG. 1, environment 100 may include user devices 110-1, ..., 110-M (where M>1), base station 120, serving gateway 130 (referred to as "SGW 130"), a mobility management entity device 140 (referred to as "MME 140"), packet data network (PDN) gateway (PGW) 150, proxy CSCF (P-CSCF) server 160, interrogating CSCF (I-CSCF) server 165, serving CSCF (S-CSCF) server 170, and network 180.

Environment 100 may include an evolved packet system (EPS) that includes a long term evolution (LTE) network and/or an evolved packet core (EPC) that operate based on a third generation partnership project (3GPP) wireless communication standard. The LTE network may be a radio access network (RAN) that includes one or more base stations, such as eNodeBs (eNBs), via which user device 110 communicates with the EPC. The EPC may include SGW 130, MME 140, and/or PGW 150 that enables user device 110 to communicate with network 180 and/or an Internet protocol (IP) multimedia subsystem (IMS) core. The IMS core may include I-CSCF server 165 and S-CSCF server 170. As shown in FIG. 1, the LTE network may include base station 120, and the EPC may include SGW 130, MME 140, and/or PGW 150.

User device 110 may include any computation or communication device, such as a portable or non-portable communication device that is capable of communicating with a network (e.g., network 180) via base station 120 and/or via wired or wireless connection with a network device (e.g., a network switch, network router, or some other network device used to access network 180). For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a desktop computer, a server, a tablet computer, a camera, a personal gaming system, or another type of computation or communication device. User device 110 may send data to and/or receive data from network 180. In some implementations, ud110 may communicate with the IMS core via sv160 or may communicate with the IMS core without involving sv160 (e.g., when ud110 connects to network 180 via base station 120).

Base station 120 may include one or more network devices that receive, process, and/or transmit traffic, such as audio, video, text, and/or other data, destined for and/or received from user device 110. In an example implementation, base station 120 may be an eNB device and may be part of the LTE network. Base station 120 may receive traffic from and/or send traffic to network 180 via SGW 130 and PGW 150. Base station 120 may send traffic to and/or receive traffic from user device 110 via an air interface. One or more of base stations 110 may be associated with a RAN, such as the LTE network.

SGW 130 may include one or more network devices, or other types of computation or communication devices, that gather, process, search, store, and/or provide information in a manner described herein. SGW 130 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 130 may, for example, aggregate traffic received from one or more base stations 110 and may send the aggregated traffic to network 180 via PGW 150. In one example implementation, SGW 130 may route and forward user data packets, may act as a mobility anchor for a user plane during inter-eNB handovers, and may act as an anchor for mobility between LTE and other 3GPP technologies. For idle state user device 110, SGW 130 may terminate a downlink (DL) data path and may trigger paging when DL data arrives for user device 110.

MME 140 may include one or more computation or communication devices that gather, process, search, store, and/or provide information in a manner described herein. For example, MME 140 may perform operations associated with a handoff to and/or from the EPS. MME 140 may perform operations to register user device 110 with the EPS, to handoff user device 110 from the EPS to another network, to handoff a user device 110 from the other network to the EPS, and/or to perform other operations. MME 140 may perform policing operations for traffic destined for and/or received from user device 110. In some implementations, MME 140 may authenticate user device 110 to communicate with elements of the EPC.

PGW 150 may include one or more network devices that gather, process, search, store, and/or provide information in a manner described herein. PGW 150 may include one or more data processing and/or traffic transfer devices, such as a gateway, a router, a modem, a switch, a firewall, a NIC, a hub, a bridge, a proxy server, an OADM, or some other type of device that processes and/or transfers traffic. PGW 150 may, for example, provide connectivity of user device 110 to external packet data networks by being a traffic exit/entry point for data of user device 110. PGW 150 may perform policy enforcement, packet filtering, charging support, lawful intercept, and/or packet screening. PGW 150 may also act as an anchor for mobility between 3GPP and non-3GPP technologies.

P-CSCF server 160 may include one or more computation or communication devices, such as a server device. In some implementations, P-CSCF server 160 may act as a gateway server to receive communications from user device 110 and relay communications to S-CSCF server 170. In some implementations, multiple P-CSCF servers 160 may forward communications on behalf of associated user devices 110 to S-CSCF server 170. For example, P-CSCF server 160 may forward communications on behalf of user device 110 to S-CSCF server 170 via I-CSCF server 165, or, alternatively, directly to S-CSCF server 170 after authenticating with I-CSCF server 165.

I-CSCF server 165 may include one or more computation or communication devices, such as a server device. In some implementations, I-CSCF server 165 may forward communications received from user device 110 and/or P-CSCF server 160 to S-CSCF server 170 based on authenticating user device 110 and/or P-CSCF server 160. In some implementations, I-CSCF server 165 may allow user device 110 and/or P-CSCF server 160 to communicate directly with S-CSCF server 170 based on authenticating user device 110 and/or I-CSCF server 165.

S-CSCF server 170 may include one or more computation or communication devices, such as a server device. In some implementations, S-CSCF server 170 may process and/or route communications to and from user device 110 via the EPC. For example, S-CSCF server 170 may process communications, received from network 180, that are destined for user device 110. In another example, S-CSCF server 170 may process communications, received from user device 110, that are destined for network 180.

Network 180 may include one or more wired and/or wireless networks. For example, network 180 may include a cellular network, a public land mobile network (PLMN), a second generation (1G) network, a third generation (3G) network, a fourth generation (4G) network, a fifth generation (5G) network, and/or another network. Additionally, or alternatively, network 180 may include a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

The quantity of devices and/or networks, illustrated in FIG. 1, is not limited to what is shown. In practice, there may be additional devices and/or networks; fewer devices and/or networks; different devices and/or networks; or differently arranged devices and/or networks than illustrated in FIG. 1. Also, in some implementations, one or more of the devices of environment 100 may perform one or more functions described as being performed by another one or more of the devices of environment 100. Devices of environment 100 may interconnect via wired connections, wireless connections, or a combination of wired and wireless connections.

Figure 2:
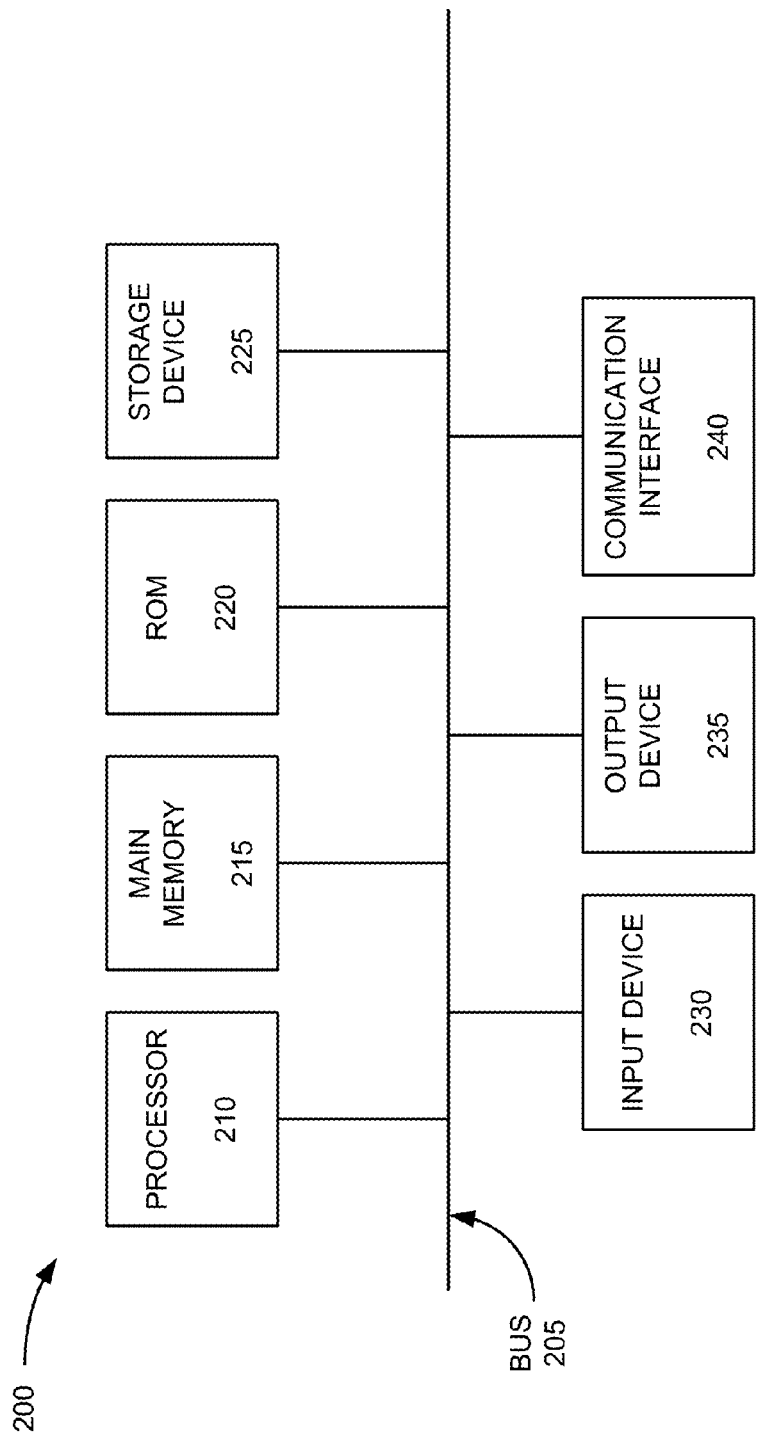
FIG. 2 illustrates example components of a device that may be used within the environment of FIG. 2.

FIG. 2 illustrates example components of a device 200 that may be used within environment 200 of FIG. 2. Device 200 may correspond to user device 110, base station 120, SGW 120, MME 140, PGW 150, P-CSCF server 160, I-CSCF server 165, and S-CSCF server 170. Each of user device 110, base station 120, SGW 120, MME 140, PGW 150, P-CSCF server 160, I-CSCF server 165, and S-CSCF server 170 may include one or more devices 200, and/or one or more components of device 200.

As shown in FIG. 2, device 200 may include a bus 205, a processor 210, a main memory 215, a read only memory (ROM) 220, a storage device 225, an input device 230, an output device 235, and a communication interface 240. In some implementations, device 200 may include additional components, fewer components, different components, or differently arranged components.

Bus 205 may include a path that permits communication among the components of device 200. Processor 210 may include a processor, a microprocessor, an application specific integrated circuit (ASIC), a field programmable gate array (FPGA), or another type of processor that interprets and executes instructions. Main memory 215 may include a random access memory (RAM) or another type of dynamic storage device that stores information or instructions for execution by processor 210. ROM 220 may include a ROM device or another type of static storage device that stores static information or instructions for use by processor 210. Storage device 225 may include a magnetic storage medium, such as a hard disk drive, or a removable memory, such as a flash memory.

Input device 230 may include a component that permits an operator to input information to device 200, such as a control button, a keyboard, a keypad, or another type of input device. Output device 235 may include a component that outputs information to the operator, such as a light emitting diode (LED), a display, or another type of output device. Communication interface 240 may include any transceiver-like mechanism that enables device 200 to communicate with other devices or networks. In one implementation, communication interface 240 may include a wireless interface, a wired interface, or a combination of a wireless interface and a wired interface.

Device 200 may perform certain operations, as described in detail below. Device 200 may perform these operations in response to processor 210 executing software instructions contained in a computer-readable medium, such as main memory 215. A computer-readable medium may be defined as a non-transitory memory device. A memory device may include memory space within a single physical storage device or memory space spread across multiple physical storage devices.

The software instructions may be read into main memory 215 from another computer-readable medium, such as storage device 225, or from another device via communication interface 240. The software instructions contained in main memory 215 may direct processor 210 to perform processes that will be described later. Alternatively, hardwired circuitry may be used in place of or in combination with software instructions to implement processes described herein. Thus, implementations described herein are not limited to any specific combination of hardware circuitry and software.

Figure 3:
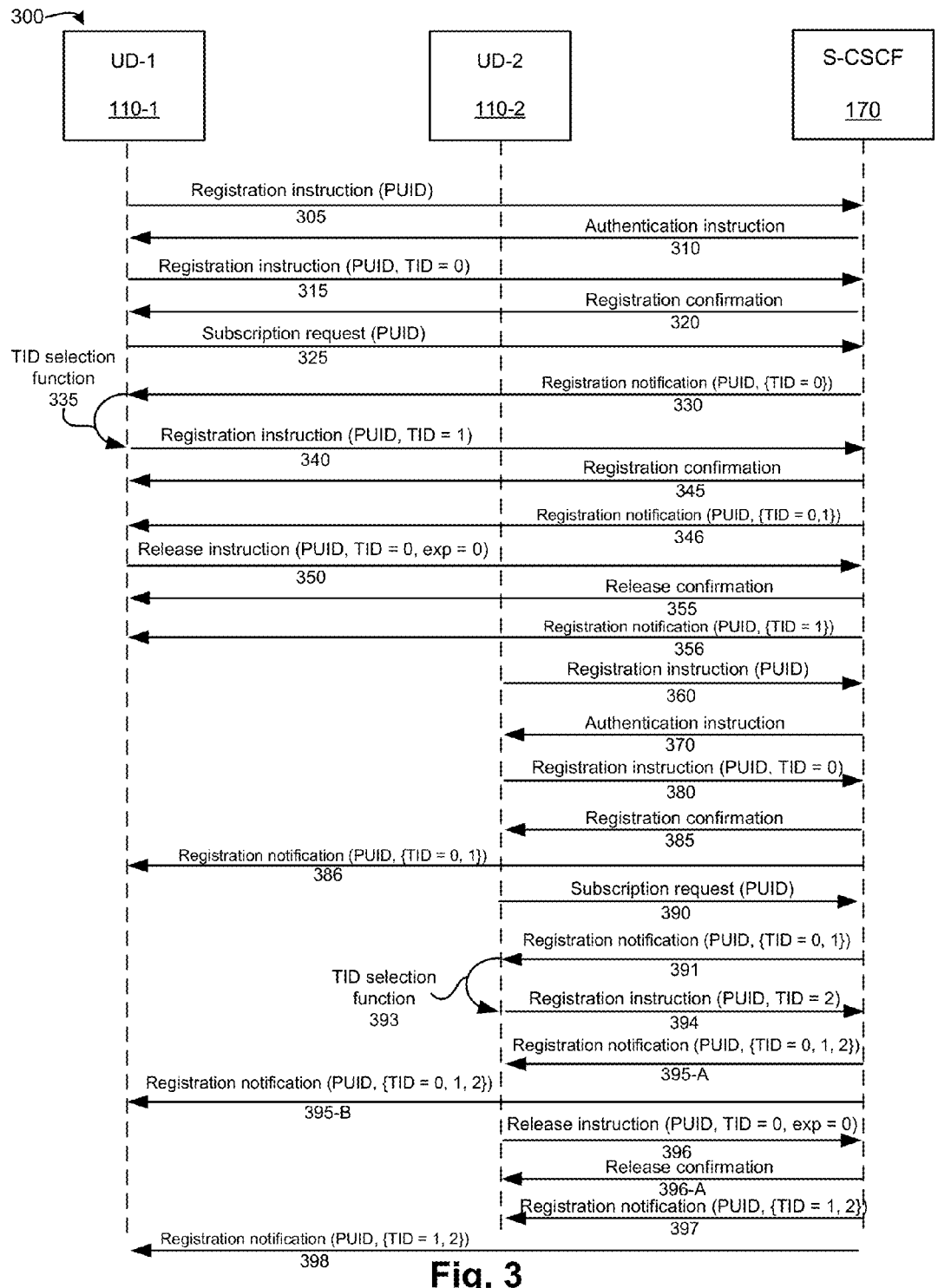
FIG. 3 illustrates a call flow diagram of example operations capable of being performed by an example portion of the environment of FIG. 2.

FIG. 3 illustrates a call flow diagram of example operations capable of being performed by an example portion 300 of environment 100. As shown in FIG. 3, portion 300 may include components and/or perform functions described above in connection with, for example, one or more of FIGS. 1-2. FIG. 3 may correspond to example operations to provide first user device 110-1 (e.g., UD-1) and/or second user device 110-2 (e.g., UD-2) with information regarding available TIDs associated with a PUID shared by UD-1 and UD-2. In some implementations, UD-1 and/or UD-2 may each select unique TIDs (e.g., based on the information regarding available TIDs) such that each of UD-1 and UD-2 may create a network session with S-CSCF server 170 using respective TIDs to perform a task associated with the common PUID (e.g., a calling/messaging task or some other task). In some implementations, portion 300 may include devices and/or servers not shown in FIG. 3 (e.g., intermediate servers, such as P-CSCF server 160 and/or I-CSCF server 165 that may send and/or receive information on behalf of UD-1, UD-2, and/or S-CSCF server 170).

In some implementations, UD-1 may provide registration instruction 305 to S-CSCF server 170 in order to make an initial contact with S-CSCF server 170 to receive information regarding available TIDs associated with a particular PUID. For example, UD-1 may provide registration instruction 305 based on receiving a selection of a TID-based application (e.g., a voice call application, a video call application, a messaging application, or some other application) from a user associated with UD-1. As described above, UD-1 may use the TID to establish a session with S-CSCF server 170 to perform a task via the selected application. In some implementations, registration instruction 305 may include information relating to a PUID such that an intermediate device (e.g., P-CSCF server 160) may discover UD-1 based on the PUID and may allow the intermediate device to provide information to S-CSCF server 170 on behalf of UD-1 independently of an authorizing device (e.g., I-CSCF server 165).

As further shown in FIG. 3, S-CSCF server 170 may provide authentication instruction 310 to UD-1 to instruct UD-1 to communicate with an authorizing device (e.g., I-CSCF server 165) to obtain authentication for registration. In some implementations, UD-1 may also receive authentication to allow an intermediate device to provide information to S-CSCF server 170 on behalf of UD-1 independently of the authorizing device.

UD-1 may provide registration instruction 315 based on receiving authentication instruction 310. In some implementations, registration instruction 315 may include authentication information (e.g., a username and password), information regarding the PUID, and a default TID value. For example, UD-1 may select a default TID value in order to make an initial communication with S-CSCF server 170 (e.g., to register UD-1 with S-CSCF server 170 in accordance with the 3GPP process or some other process). In FIG. 3, assume that the default TID value is equal to zero.

In some implementations, the default TID value may correspond to a temporary TID to allow UD-1 to communicate and/or register with S-CSCF server 170 when UD-1 has yet to determine a non-temporary TID used to perform a calling/messaging task via S-CSCF server 170. Additionally, or alternatively, the default TID may be used to prevent a race condition in which multiple user devices 110 communicate with S-CSCF server 170 simultaneously (e.g., to register with S-CSCF server 170 to receive information regarding available TIDs). For example, user device 110 may use the default TID to communicate with S-CSCF server 170 when the default TID is available, thereby preventing multiple user devices 110 from communicating with S-CSCF server 170 using the default TID at the same time. As described below, UD-1 may release the default TID when UD-1 obtains a TID that is different than the default TID, thereby allowing UD-2 to use the default TID to communicate with S-CSCF server 170 (e.g., to register UD-2 with S-CSCF server 170 such that S-CSCF server 170 may provide information regarding available TIDs to UD-2).

As further shown in FIG. 3, S-CSCF server 170 may provide registration confirmation 320 to UD-1 to identify that UD-1 is registered with S-CSCF server 170. Further, registration confirmation 320 may identify that UD-1 may communicate with S-CSCF server 170 using the default TID value of zero. In some implementations, registration confirmation 320 may include an indication that the TID value of zero is unavailable and that UD-1 may not communicate with S-CSCF server 170 (e.g., in an example where multiple user devices 110 use the TID value of zero at the same time) thereby preventing conflict between multiple user devices 110. In some implementations, UD-1 may provide subscription request 325 to S-CSCF server 170 based on receiving registration confirmation 320. As shown in FIG. 3, subscription request 325 may include information regarding the PUID and may include a request for a list of TIDs, associated with the PUID, that are currently available and/or currently unavailable (e.g., an available TID may correspond to a TID that is not assigned and not registered to a user device 110, whereas an unavailable TID may correspond to a TID that is assigned and registered to a user device 110).

As further shown in FIG. 3, S-CSCF server 170 may provide registration notification 330 to UD-1 based on receiving subscription request 325 from UD-1. In some implementations, registration notification 330 may include a list of TIDs, associated with the PUID, that are currently unavailable and/or currently available. In FIG. 3, assume that only the TID value of zero is currently unavailable (e.g., since UD-1 registered using the TID value of zero as described above with respect to registration instruction 315). In some implementations, and as shown in FIG. 3, registration notification 330 may include information to identify that the TID value zero associated with the PUID of subscription request 325 is currently unavailable. As described above, registration notification 330 may include information to identify one or more TIDs that are available for the PUID. In some implementations, registration notification 330 may include an indication that no available TIDs exist, thereby preventing UD-1 from selecting a TID (e.g., to prevent greater than a threshold quantity of user devices 110 from selecting TIDs associated with a particular PUID).

In some implementations, UD-1 may perform TID selection function 335 and may select a TID based on information included in registration notification 330. For example, assume that registration notification 330 includes an indication that the TID having a value of one is available. UD-1 may select the TID corresponding to the value of one based on performing TID selection function 335. In some implementations, UD-1 may select a TID value in sequential order when multiple TIDs are available (e.g., UD-1 may select a TID value of one when a TID value of two and a TID value of three are available).

As shown in FIG. 3, UD-1 may provide registration instruction 340 to S-CSCF server 170 based on performing TID selection function 335. In some implementations, registration instruction 340 may include an instruction to register the TID value, selected by UD-1 when performing TID selection function 335, with the PUID and with UD-1. Continuing with the above example, registration instruction 340 may include information regarding the PUID and may further include a TID value of one. In some implementations, S-CSCF server 170 may provide registration confirmation 345 to UD-1 followed with registration notification 346 to identify TID values associated with the PUID. Continuing with the above example, registration notification 346 may include information to identify that TID values of zero and one are registered with the PUID (e.g., since UD-1 registered the TID value of zero as part of registration instruction 315 and the TID value of one as part of registration instruction 340).

As further shown in FIG. 3, UD-1 may provide S-CSCF server 170 with release instruction 350 based on receiving registration confirmation 345. In some implementations, release instruction 350 may include an instruction to release a particular TID associated with the PUID at a particular expiration time. Continuing with the above example, release instruction 350 may include an instruction to release the default TID (e.g., the TID value of zero) associated with the PUID at an immediate time (e.g., as represented by an expiration ("exp") time of zero). UD-1 may also provide release instruction 350 to release the selected TID value of TID selection function 335 (e.g., to make the TID value available for usage by another user device 110). In some implementations, S-CSCF server 170 may provide release confirmation 355 to UD-1 based on receiving release instruction 350.

In some implementations, registration notification 356 will follow and may include information to identify registered TIDs associated with the PUID and to verify that TID, associated with release instruction 350, is no longer registered and is available. Continuing with the above example, registration notification 356 may include information to identify that only the TID value of one is registered (e.g., since release instruction 350 included an instruction to release, or make available, the TID value of zero). As a result, the TID value of zero (e.g., the default TID value) may be made available for UD-2 to communicate with S-CSCF server 170 (e.g., to receive TID availability information such that UD-2 may select an available TID to perform a task via S-CSCF server 170).

As further shown in FIG. 3, UD-2 may provide registration instruction 360 to S-CSCF server 170 in order to make an initial connection with S-CSCF server 170 in a similar manner as described above with respect to registration instruction 305. In some implementations, registration instruction 360 may include the same PUID of registration instruction 305 to identify that UD-2 is associated with the same PUID of UD-1. In some implementations, S-CSCF server 170 may provide authentication instruction 370 to UD-2 to authenticate UD-2 registration instruction 360 and/or to allow an intermediate device to provide information to S-CSCF server 170 on behalf of UD-2 independently of an authorizing device.

As further shown in FIG. 3, UD-2 may provide registration instruction 380 based on receiving authentication instruction 370. In some implementations, registration instruction 380 may include authentication information (e.g., a username and password), information regarding the PUID, and a default TID value. For example, UD-2 may select the default TID value of zero in order to make an initial communication with S-CSCF server 170 (e.g., to register UD-2 with S-CSCF server 170 in accordance with the 3GPP process or some other process).

As further shown in FIG. 3, S-CSCF server 170 may provide registration confirmation 385 to UD-2 to identify that UD-2 is registered with S-CSCF server 170. In some implementations, registration confirmation 385 may also identify that UD-2 may communicate with S-CSCF server 170 using the default terminal ID value of zero. In some implementations, registration notification 386 may be provided to all user devices 210 which have been previously registered. In some implementations, UD-2 may provide subscription request 390 to S-CSCF server 170 based on receiving registration confirmation 385. As shown in FIG. 3, subscription request 390 may include information regarding the PUID and may include a request for a list of TIDs, associated with the PUID, that are currently unavailable (registered) and/or currently available (not registered).

As further shown in FIG. 3, S-CSCF server 170 may provide registration notification 391 to UD-2 based on receiving subscription request 390 from UD-2. In some implementations, registration notification 391 may include a list of TIDs, associated with the PUID, that are currently available and/or currently unavailable. Continuing with the above example, registration notification 391 may include an indication that the TID value of zero and TID value of one are currently unavailable (e.g., since UD-1 registered the TID value of one as described above with respect to registration instruction 340 and since UD-2 registered the TID value of zero as described above with respect to registration instruction 380). In some implementations, registration notification 386 may alert a user of UD-1 that a TID has been registered for the PUID of UD-1. In some implementations, UD-2 may perform TID selection function 393 and may select a TID based on information included in registration notification 391. For example, assume that registration notification 391 includes an indication that the TID having a value of two is available. UD-2 may select the TID corresponding to the value of two based on performing TID selection function 393.

As shown in FIG. 3, UD-1 may provide registration instruction 394 to S-CSCF server 170 based on performing TID selection function 393. In some implementations, registration instruction 394 may include an instruction to register the TID value, selected by UD-2 when performing TID selection function 393, with the PUID. Continuing with the above example, registration instruction 394 may include information regarding the PUID and may further include information to identify a TID value of two. In some implementations, S-CSCF server 170 may provide registration notification 395-A to UD-2 to identify TID values associated with the PUID. In some implementations, CSCF server 170 may provide registration notification 395-B to UD-1 to identify TID values associated with the PUID and to notify UD-1 that UD-2 has registered a TID with the PUID.

Continuing with the above example, registration notification 395-A may include information to identify that TID values of zero, one, and two are registered with the PUID (e.g., since UD-2 registered the TID value of zero as part of registration instruction 380, UD-1 registered the TID value of one as part of registration instruction 340, and UD-2 registered the TID value of two as part of registration instruction 394). As a result, UD-2 may determine and register an available TID that is different than the default TID to communicate with S-CSCF server 170 to perform a task (e.g., a calling/messaging task or some other task).

As further shown in FIG. 3, UD-2 may provide S-CSCF server 170 with release instruction 396 based on receiving registration notification 395-A. In some implementations, release instruction 396 may include an instruction to unregister a particular TID associated with the PUID at a particular expiration time. Continuing with the above example, release instruction 396 may include an instruction to unregister the default TID (e.g., the TID value of zero) associated with the PUID at an immediate time (e.g., as represented by an expiration ("exp") time of zero). In some implementations, S-CSCF server 170 may provide release confirmation 397 to UD-1 based on receiving release instruction 396.

In some implementations, release confirmation 396-A may include information to identify registered TIDs associated with the PUID and to verify that TID, associated with release instruction 396, is no longer registered and is available. Continuing with the above example, registration notification 397 will be sent to UD-2 may include information to identify that the TID values of one and two are registered (e.g., since release instruction 396 included an instruction to release, or make available, the TID value of zero). As a result, the TID value of zero (e.g., the default TID value) may be made available for some other user device 110 to communicate with S-CSCF server 170 (e.g., to receive TID availability information such that user device 110 may select an available TID to perform a task via S-CSCF server 170).

As further shown in FIG. 3, S-CSCF server 170 may provide registration notification 398 (e.g., with information similar to that of registration confirmation 397) to UD-1 to alert UD-1 that the TID value of zero has been released (e.g., since the TID value of zero is no longer registered).

While a particular series of operations and/or data flows have been described above with regards to FIG. 3, the order of the operations and/or data flows may be modified in other implementations. Further, non-dependent operations may be performed in parallel. In some implementations, additional servers and/or devices not shown in FIG. 3 may send and/or receive information relating to the operations and data flows described in FIG. 3 and the additional servers and/or devices are not precluded from sending and/or receiving information relating to the operations and data flows. For example, I-CSCF server 165 may receive authentication instruction 310 from S-CSCF server 170 and may relay authentication instruction 310 to UD-1. Additionally, or alternatively, P-CSCF server 160 may receive registration instructions from UD-1 and/or UD-2, and provide the registration instruction to S-CSCF server 170. Further, while specific TID values and formats have been described, in practice, different TID values having different formats may be used than what is described above.

In some implementations, user device 210 may subscribe to notifications associated with registrations of TIDs with a PUID and may determine TIDs with which to registered even when S-CSCF server 170 does not provision user device 210 with information regarding selection or assignment of a terminal identifier.

FIG. 4 illustrates an example data structure 400 that may be stored by one or more devices in environment 200, such as S-CSCF server 170. In one implementation, data structure 400 may be stored in a memory of S-CSCF server 170. In another implementation, data structure 400 may be stored in a memory separate from, but accessible by, S-CSCF server 170. In some implementations, data structure 400 may be stored by some other device in environment 200, such as user device 110, base station 120, SGW 120, MME 140, a PGW 150, P-CSCF server 160, and/or I-CSCF server 165.

A particular instance of data structure 400 may contain different information and/or fields than another instance of data structure 400. In some implementations, data structure 400 may correspond to information associated with available TIDs for particular PUIDs. One instance of data structure 400 may store information regarding one device in environment 200, whereas another instance of data structure 400 may store information another device in environment 200.

As shown in FIG. 4, data structure 400 may include PUID field 410, registered TIDs field 420, and unregistered TIDs field 430.

PUID field 410 may store information to uniquely identify a PUID associated with one or more user devices 110. As described above, a PUID may include information, such as a telephone number, a username, or some other identifier. As shown in FIG. 4, each entry associated with PUID field 410 may store a unique string of characters. While a particular format and length of the string of characters in PUID field 410 is shown in FIG. 4, in practice, PUID field 410 may store any number of characters in any format.

Registered TIDs field 420 may store information for TID values which may be registered with a corresponding PUID. For example, assume that a TID value of one is registered with the PUID of 5555845 (e.g., in accordance with registration instruction 340 or some other registration instruction described above with respect to portion 300). Registered TIDs field 420 my store the TID value of one corresponding to the PUID of 5555845.

Unregistered TIDs field 430 may store information for TID values which may not be currently registered to a corresponding PUID and which may be available for a PUID. For example, assume that the TID values of zero, two, three, and four are not registered with the PUID of 5555845. Unregistered TIDs field 430 may store information identifying the TID values of zero, two, three, and four.

In some implementations, the quantity of total TID values (e.g., the sum of the quantity of registered TIDs and the quantity of unregistered TIDs) may be based on information provided by user device 110, P-CSCF server 160, and/or I-CSCF server 165. For example, a user, associated with user device 110, may specify a quantity of total TID values of five (or some other quantity). Alternatively, a quantity of total TID values may be specified in order to control network resources associated with assigning multiple TID values with a single PUID.

While particular fields are shown in a particular format in data structure 400, in practice, data structure 400 may include additional fields, fewer fields, different fields, or differently arranged fields than are shown in FIG. 4.

Figure 5A:
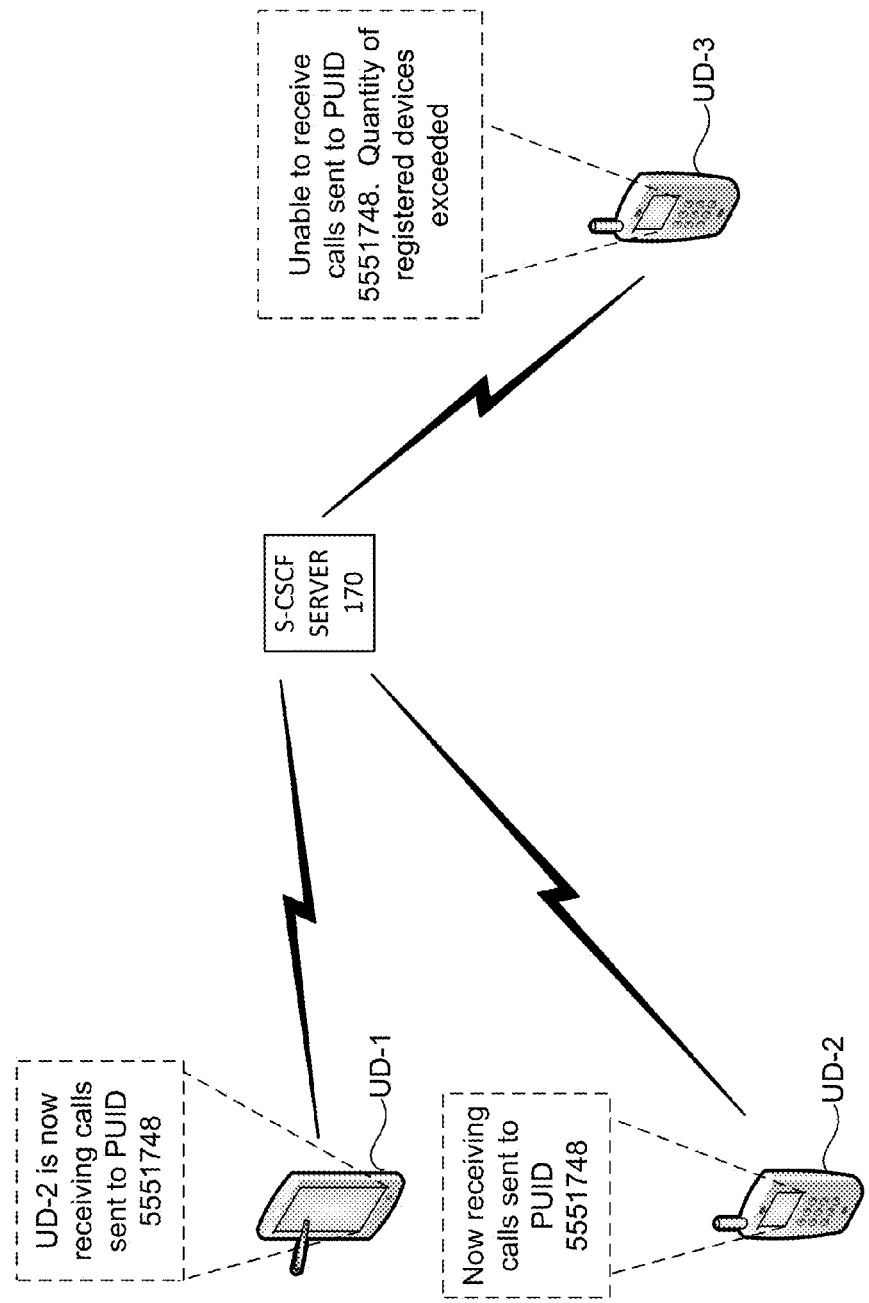
FIGS. 5A-5C illustrate example implementations as described herein.
Figure 5B:
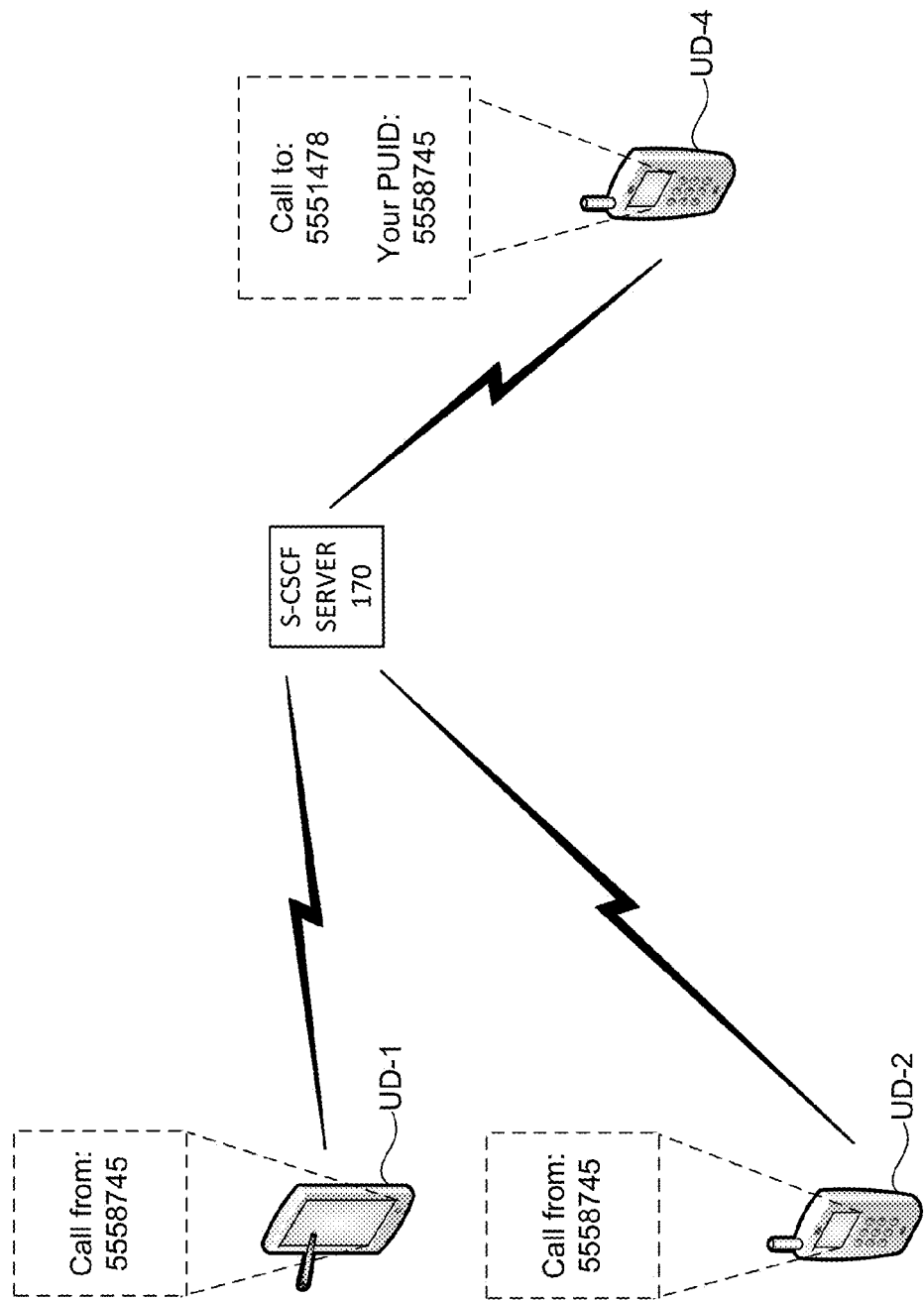
Figure 5C:
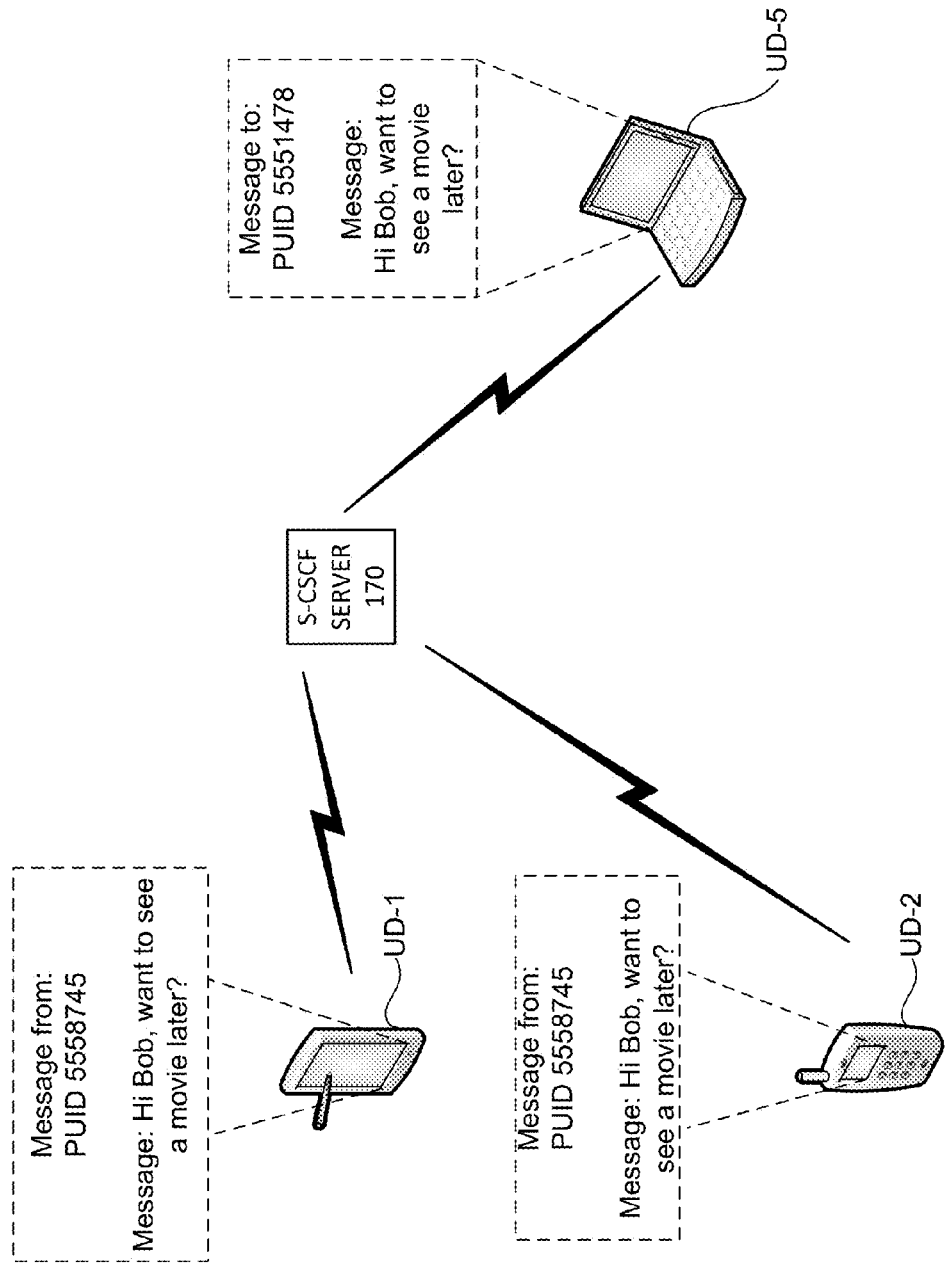

FIGS. 5A-5C illustrate example implementations as described herein. In some implementations, FIGS. 5A-5C may correspond to the registration of multiple TIDs for a common PUID associated with multiple user devices 110. In FIG. 5A, assume that UD-1 registers a TID with the PUID of 5551748 in accordance with operations and/or data flows as described above with respect to portion 300 (e.g., in order to send/receive communications, such as telephone calls/messages sent to/from other user devices 110 to UD-1). Further assume, that UD-2 registers a TID with the same PUID of 5551748 after UD-1 has registered a TID and that UD-3 attempts to register a TID with the same PUID of 5551748 after UD-1 and UD-2 have each registered respective TIDs. Further assume that a threshold quantity of two non-default TIDs may be registered with the PUID of 5551748.

As shown in FIG. 5A, UD-2 may receive an indication that communications (e.g., telephone calls and/or messages) sent to the PUID of 5551748 may be received by UD-2 since UD-2 may communicate with S-CSCF server 170 using the TID associated with the PUID. As further shown in FIG. 5A, UD-1 may receive an indication that UD-2 is receiving communications sent to the PUID of 5551748 (e.g., to inform UD-1 of intended or unintended registration of a TID with the PUID). As further shown in FIG. 5A, UD-3 may receive an indication that TID registration has failed since the threshold quantity of two non-default TIDs may be registered with the PUID of 5551748. As a result, UD-1 and UD-2 may each be used to send/receive communications using the PUID of 5551748 while UD-3 may not be used send/receive communications associated with the PUID of 5551748 when the threshold quantity of non-default TIDs is exceeded (e.g., S-CSCF server 170 may prevent UD-3 from sending/receiving communications associated with the PUID of 5551748). Further, UD-1 and/or UD-2 may release their respective TIDs to make a TID available for UD-3 to register and use to communicate with S-CSCF server 170.

Continuing with the above example, assume that a fourth user device 110 (e.g., UD-4) is associated with the PUID of 5558745 and that a user of UD-4 places a telephone call to the PUID of 5551478 (e.g., a PUID associated with UD-1 and UD-2, as described above with respect to FIG. 5A). As shown in FIG. 5B, UD-1 and UD-2 may each receive an indication of a received telephone call placed by UD-4 to user devices 110 associated with the PUID of 5551478 (i.e., UD-1 and UD-2).

Continuing with the above example, assume that a fifth user device 110 (e.g., UD-5) is associated with the PUID of 5558745 and that a user of UD-5 sends a message to the PUID of 5551478 (e.g., the PUID associated with UD-1 and UD-2, as described above with respect to FIGS. 5A-5B). As shown in FIG. 5C, UD-1 and UD-2 may each receive an indication of a received message sent by UD-5 to user devices 110 associated with the PUID of 5551478 (i.e., UD-1 and UD-2).

While particular examples are shown in FIGS. 5A-5C, it will be apparent that the above description is merely an example implementation. For example, while particular indications are shown in FIGS. 5A-5C, in practice, some other user interface or indication may be implemented in context with the examples described in FIGS. 5A-5C. Further, while examples are described in terms of performing functions relating to telephone calls and messages by registering TIDs with PUIDs, in practice, TIDs may be registered with some other type of ID to allow multiple user devices to perform some other task associated with a common ID.

As described above, user device 110 may receive information regarding available TIDs from S-CSCF server 170 (e.g., by registering a default TID value to communicate with S-CSCF server 170 to receive the information regarding the available TIDs) and may select an available TID value based on the information regarding the available TIDs. Further, a race condition may be prevented between multiple user devices 110 attempting to use the default TID value at the same time, thereby preventing conflict of TID registration between multiple user devices 110. Additionally, user devices 110 may release or unregister a TID to make the TID available for registration by another user device 110, thereby allowing multiple user devices 110 to register respective TIDs associated with a common PUID while preventing conflict between TIDs (e.g., preventing instances where multiple TIDs may be registered to the same user device 110).

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
receiving, by a server and from a first user device, a first identifier, a first value of a second identifier, and a first instruction to register the first value of the second identifier with the first identifier and with the first user device;
determining, by the server, whether the first value of the second identifier is available for registration;
registering, by the server, the first value of the second identifier with the first identifier and with the first user device based on determining that the first value of the second identifier is available for registration,
the server registering the first value of the second identifier without provisioning the first user device;
receiving, by the server and from the first user device, a first subscription request to receive information regarding one or more available second values of the second identifier associated with the first identifier, based on registering the first value of the second identifier with the first identifier and with the first user device;
providing, by the server and to the first user device, a notification of a first registration event based on receiving the subscription request,
 the notification including a list of unavailable second values of the second identifier or a list of available second values of the second identifier;
receiving, by the server and from the first user device, a second instruction,
 the second instruction including an instruction to register a first one of the available second values of the second identifier with the first identifier and with the first user device;
registering, by the server, the first one of the available second values of the second identifier with the first identifier and with the first user device based on receiving the second instruction;
receiving, by the server and from the first user device, a third instruction,
 the third instruction including an instruction to unregister the first value of the second identifier with the first identifier and with the first user device;
unregistering, by the server, the first value of the second identifier with the first identifier and with the first user device based on receiving the third instruction; and
storing, by the first server, information indicating that the first value of the second identifier is not registered with the first identifier or with the first user device.

2. The method of claim 1, further comprising:
receiving a fourth instruction from a second user device,
 the fourth instruction including the first identifier, the first value of the second identifier, and an instruction to register the first value of the second identifier with the first identifier and with the second user device;
determining that the first value of the second identifier is available for registration based on the information indicating that the first value of the second identifier is not registered with the first identifier or with the first user device;
registering the first value of the second identifier with the first identifier and with the second user device based on determining that the first value of the second identifier is available for registration;
receiving, from the second user device, a second subscription request to receive information regarding the one or more available second values of the second identifier associated with the first identifier, based on registering the first value of the second identifier with the first identifier and with the second user device;
providing, to the second user device, notification of a second event including the list of unavailable second values of the second identifier or the list of available second values of the second identifier;
receiving, from the second user device, a fifth instruction,
 the fifth instruction including an instruction to register a second one of the available second values of the second identifier with the first identifier and with the second user device; and
registering, by the server, the second one of the available second values of the second identifier with the first identifier and with the second user device based on receiving the fifth instruction.

3. The method of claim 2, further comprising:
receiving a communication from a third user device,
 the communication including the first identifier associated with the first user device and with the second user device; and
providing information regarding the communication to the first user device and the second user device.

4. The method of claim 1, further comprising:
providing, to the first user device, a response associated with the first instruction based on determining that the second identifier is not available for registration; and
preventing the first user device from communicating with the server to send or receive a communication associated with the first identifier based on providing the response associated with the first instruction.

5. The method of claim 1, where the notification indicates no available second values of the second identifier, the method further comprising:
preventing the first user device from communicating with the server to send or receive a communication associated with the first identifier based on providing the response to the first query.

6. A system comprising:
a processor configured to:
 receive, from a first user device, a first identifier, a first value of a second identifier, and a first instruction to register the first value of the second identifier with the first identifier and with the first user device,
 determine whether the first value of the second identifier is available for registration;
 provide, to the first user device, a response associated with the first instruction based on determining that the first value of the second identifier is not available for registration,
  the response associated with the first instruction indicating that the first value of the second identifier is not available for registration;
 prevent the first user device from communicating with the processor to send or receive a communication associated with the first identifier based on providing the response associated with the first instruction;
 register the first value of the second identifier with the first identifier and with the first user device based on determining that the first value of the second identifier is available for registration;
 receive, from the first user device, a first subscription request to receive information regarding one or more available second values of the second identifier associated with the first identifier, based on registering the first value of the second identifier with the first identifier and with the first user device;
 provide, to the first user device, a notification of a first registration event,
  the notification including a list of unavailable second values of the second identifier or a list of available second values of the second identifier;
 receive, from the first user device, a second instruction including an instruction to register a first one of the available second values of the second identifier with the first identifier and with the first user device;
 register the first one of the available second values of the second identifier with the first identifier and with the first user device based on receiving the second instruction;
 receive, from the first user device, a third instruction including an instruction to unregister the first value of the second identifier with the first identifier and with the first user device;

unregister the first value of the second identifier with the first identifier and with the first user device based on receiving the third instruction; and store information indicating that the first value of the second identifier is not registered with the first identifier or with the first user device.

7. The system of claim 6, where the processor is further configured to:

provide, to the first user device, a response to the second instruction based on registering the one of the available second values of the second identifier with the first identifier and with the first user device, the response to the second instruction indicating that the first value of the second identifier and the one of the available second values of the second identifier is registered with the first identifier and with the first user device.

8. The system of claim 6, where processor is further configured to:

receive a fourth instruction from a second user device, the fourth instruction including the first identifier, the first value of the second identifier, and an instruction to register the first value of the second identifier with the first identifier and with the second user device;

determine that the first value of the second identifier is available for registration based on the information indicating that the first value of the second identifier is not registered with the first identifier or with the first user device;

register the first value of the second identifier with the first identifier and with the second user device based on determining that the first value of the second identifier is available for registration;

receive, from the second user device, a subscription request to receive information regarding the one or more available second values of the second identifier associated with the first identifier, based on registering the first value of the second identifier with the first identifier and with the second user device;

provide, to the second user device, a notification of a second registration event, the notification including the list of the unavailable second values of the second identifier or the list of available second values of the second identifier;

receive, from the second user device, a fifth instruction, the fifth instruction including an instruction to register a second one of the available second values of the second identifier with the first identifier and with the second user device;

register the second one of the available second values of the second identifier with the first identifier and with the second user device based on receiving the fifth instruction; and provide, to the first user device and the second user device, an updated list of unavailable second values of the second identifier or an updated list of available second values of the second identifier.

9. The system of claim 8, where the processor is further configured to:

receive a communication from a third user device, the communication including the first identifier associated with the first user device and with the second user device; and provide information regarding the communication to the first user device and the second user device.

10. The system of claim 6, where, when the notification indicates no available second values of the second identifier, the processor is further configured to:

prevent the first user device from communicating with the processor to send or receive a communication associated with the first identifier based on providing the notification.

11. A non-transitory computer-readable medium storing instructions, the instructions comprising:

one or more instructions that, when executed by one or more processors associated with a server, cause the one or more processors to:

receive, from a first user device, a first identifier, a first value of a second identifier, and a first instruction to register the first value of the second identifier with the first identifier and with the first user device;

determine whether the first value of the second identifier is available for registration;

register the first value of the second identifier with the first identifier and with the first user device based on determining that the first value of the second identifier is available for registration;

receive, from the first user device, a first subscription request to receive information regarding one or more available second values of the second identifier, based on registering the first value of the second identifier with the first identifier and with the first user device;

provide, to the first user device, a notification of a first registration event, including a list of unavailable second values of the second identifier or a list of available second values of the second identifier;

prevent the first user device from communicating with the server to send or receive a communication associated with the first identifier based on the notification indicating no available second values of the second identifier;

receive, from the first user device, a second instruction including an instruction to register a first one of the available second values of the second identifier with the first identifier and with the first user device based on the notification indicating one or more available second values of the second identifier;

register the first one of the available second values of the second identifier with the first identifier and with the first user device based on receiving the second instruction;

receive, from the first user device, a third instruction including an instruction to unregister the first value of the second identifier with the first identifier and with the first user device;

unregister the first value of the second identifier with the first identifier and with the first user device based on receiving the third instruction; and store information to indicate that the first value of the second identifier is not registered with the first identifier or with the first user device and that the first value of the second identifier is available for registration.

12. The non-transitory computer-readable medium of claim 11, where the instructions further comprise:

one or more instructions that, when executed by the one or more processors, cause the one or more processors to:

provide, to the first user device, a response to the second instruction based on registering the first one of the available second values of the second identifiers with the first identifier and with the first user device, the response indicating that the first value of the second identifier and the first one of the available second values of the second identifiers is registered with the first identifier and with the first user device.

13. The non-transitory computer-readable medium of claim 11, where the instructions further comprise:
one or more instructions that, when executed by the one or more processors, cause the one or more processors to:
receive a fourth instruction from a second user device, the fourth instruction including the first identifier, the first value of the second identifier, and an instruction to register the first value of the second identifier with the first identifier and with the second user device;
determine that the first value of the second identifier is available for registration based on information stored by the server that indicates the first value of the second identifier is available for registration;
register the first value of the second identifier with the first identifier and with the second user device based on determining that the first value of the second identifier is available for registration;
receive, from the second user device, a second subscription request to receive information regarding available second values of the second identifier, based on registering the first value of the second identifier with the first identifier and with the second user device;
provide, to the second user device, a notification of a second registration event including the list of the unavailable second values of the second identifier or the list of available second values of the second identifier;
receive, from the second user device, a fifth instruction including an instruction to register a second one of the available second values of the second identifier with the first identifier and with the second user device; and
register the second one of the available second values of the second identifier with the first identifier and with the second user device based on receiving the fifth instruction; and
provide, to the first user device and to the second user device, an updated list of unavailable second values of the second identifier or an updated list of available second values of the second identifier.

14. The non-transitory computer-readable medium of claim 13, where the instructions further comprise:
one or more instructions that, when executed by the one or more processors, cause the one or more processors to:
receive a communication from a third user device, the communication including the first identifier associated with the first user device and with the second user device; and
provide information regarding the communication to the first user device and the second user device.

15. The non-transitory computer-readable medium of claim 11, where the instructions further comprise:
one or more instructions that, when executed by the one or more processors, cause the one or more processors to:
provide, to the first user device, a response associated with the first instruction based on determining that the first value of the second identifier is not available for registration; and
prevent the first user device from communicating with the server to send or receive a communication associated with the first identifier based on providing the response associated with the first instruction.

16. A method comprising:
selecting, by a first user device, a first value of a first identifier;
providing, by the first user device and to a server, the first value of the first identifier, a second identifier, and a first instruction to cause the server to register the first value of the first identifier with the second identifier and with the first user device;
receiving, by the first user device and from the server, a response to the first instruction,
the response indicating whether the server registered the first value of the first identifier with the second identifier and with the first user device;
providing, by the first user device and to the server, a request for a subscription to receive information regarding one or more available second values of the first identifier based on the response indicating that the server registered the first value of the first identifier with the second identifier and with the first user device;
receiving, by the first user device from the server, a list of unavailable second values of the first identifier or a list of available second values of the first identifier;
providing, by the first user device and to the server, a second instruction including an instruction to register one of the available second values of the first identifier with the second identifier and with the first user device; and
providing, by the first user device and to the server, a third instruction including an instruction to unregister the first value of the first identifier with the second identifier and with the first user device,
the server unregistering the first value of the first identifier with a second identifier and with the first user device based on receiving the third instruction, and
the first value of the first identifier being available for registering with the second user device based on unregistering the first value of the first identifier with the first user device.

17. The method of claim 16, further comprising:
receiving, from the server, a response to the second instruction based on providing the second instruction,
where the response includes an indication that the one of the available second values of the first identifier is registered with the second identifier and with the first user device, and
where the providing the third instruction to the server is based on receiving the response to the second instruction.

18. The method of claim 16, further comprising:
receiving information indicating that the first value of the first identifier is available for registering the server unregistering the first value of the first identifier with the second identifier and with the first user device.

19. A system comprising:
a first user device including a processor configured to:
select a first value of a first identifier;
provide, to a server, the first value of the first identifier, a second identifier, and a first instruction to cause the server to register the first value of the first identifier with the second identifier and with the first user device;
receive, from the server, a response to the first instruction,
the response indicating whether the server registered the first value of the first identifier with the second identifier and with the first user device;

provide a request for a subscription to receive information regarding one or more available second values of the first identifier;

receive, from the server, a list of unavailable second values of the first identifier or a list of available second values of the first identifier;

provide, to the server, a second instruction, the second instruction including an instruction to register one of the available second values of the first identifier with the second identifier and with the first user device;

receive, from the server, a response to the second instruction based on providing the second instruction, the response to the second instruction including an indication that the one of the available second values of the first identifier is registered with the first value of the first identifier and with the first user device; and provide, to the server, a third instruction including an instruction to unregister the first value of the first identifier with the second identifier and with the first user device based on receiving the response to the second instruction, the server unregistering the first value of the first identifier with the second identifier and with the first user device based on receiving the third instruction, the server updating the list of unavailable second values of the first identifier or the list of available second values of the first identifier, and the server notifying the first user device when the server updates the list of unavailable second values of the first identifier or the list of available second values of the first identifier.

20. The system of claim 19, where the processor is further configured to:

receive information associated with the updated list of unavailable second values of the first identifier or the updated list of available second values of the first identifier.

* * * * *